(12) United States Patent
Andre

(10) Patent No.: US 10,747,904 B2
(45) Date of Patent: Aug. 18, 2020

(54) DETECTION OF THE OPENING OF A DATA-ENTRY DEVICE

(71) Applicant: INGENICO GROUP, Paris (FR)

(72) Inventor: Jerome Andre, Montoison (FR)

(73) Assignee: INGENICO GROUP, Paris (FR)

( * ) Notice: Subject to any disclaimer, the term of this patent is extended or adjusted under 35 U.S.C. 154(b) by 170 days.

(21) Appl. No.: 15/482,099

(22) Filed: Apr. 7, 2017

(65) Prior Publication Data

US 2017/0293774 A1 Oct. 12, 2017

(30) Foreign Application Priority Data

Apr. 8, 2016 (FR) ..................................... 16 53130

(51) Int. Cl.
| | | |
|---|---|---|
| *G06F 21/70* | (2013.01) | |
| *G06F 21/86* | (2013.01) | |
| *G06F 21/83* | (2013.01) | |

(52) U.S. Cl.
CPC ............. *G06F 21/70* (2013.01); *G06F 21/83* (2013.01); *G06F 21/86* (2013.01)

(58) Field of Classification Search
CPC ........... G06F 21/70; G06F 21/83; G06F 21/86
See application file for complete search history.

(56) References Cited

U.S. PATENT DOCUMENTS

| | | | | |
|---|---|---|---|---|
| 5,675,319 A * | 10/1997 | Rivenberg | ........... | G08B 13/128 340/540 |
| 5,768,386 A * | 6/1998 | Yokomoto | ............. | G06F 21/83 345/173 |
| 6,879,032 B2 * | 4/2005 | Rosenau | .............. | G02B 6/4201 257/696 |
| 6,996,953 B2 * | 2/2006 | Perreault | ............. | G08B 13/128 206/706 |
| 8,589,703 B2 * | 11/2013 | Lee | ......................... | G06F 21/86 257/922 |
| 8,621,235 B2 * | 12/2013 | Barrowman | ........... | G08B 21/18 713/189 |
| 9,009,860 B2 * | 4/2015 | Klum | ..................... | G06F 21/86 702/138 |
| 9,268,374 B2 * | 2/2016 | Schang | ................. | G06F 1/1692 |
| 9,430,675 B2 * | 8/2016 | McNicoll | ............... | G06F 21/74 |

(Continued)

FOREIGN PATENT DOCUMENTS

| | | |
|---|---|---|
| EP | 2146562 A1 | 1/2010 |
| FR | 2906623 A1 | 4/2008 |

OTHER PUBLICATIONS

French Search Report and Written Opinion dated Jan. 24, 2017 for corresponding French Application No. 1653130, filed Apr. 8, 2016.

(Continued)

*Primary Examiner* — Chau Le
*Assistant Examiner* — Vance M Little
(74) *Attorney, Agent, or Firm* — David D. Brush; Westman, Champlin & Koehler, P.A.

(57) ABSTRACT

A data-entry device includes an upper cover to which a capacitive pad is affixed through the exterior. The capacitive pad has at least one flexible security element having at least one electrical track connected to a cut-detection module in the device. The shape and the mounting of the at least one security device is adapted to exert a force on the internal face of the upper cover.

5 Claims, 5 Drawing Sheets

(56) References Cited

U.S. PATENT DOCUMENTS

| | | | |
|---|---|---|---|
| 9,760,127 B2* | 9/2017 | Sugiyama | G06F 21/86 |
| 2008/0180245 A1* | 7/2008 | Hsu | G06F 21/86 |
| | | | 340/571 |
| 2009/0321302 A1 | 12/2009 | Dubois et al. | |
| 2010/0102127 A1 | 4/2010 | Bonnet et al. | |
| 2011/0032211 A1* | 2/2011 | Christoffersen | G06F 3/0414 |
| | | | 345/174 |
| 2011/0248860 A1* | 10/2011 | Avital | H05K 1/0275 |
| | | | 340/652 |
| 2014/0184415 A1* | 7/2014 | Edmonds | G07F 7/0873 |
| | | | 340/686.1 |
| 2015/0091418 A1* | 4/2015 | Chung | H04M 1/0249 |
| | | | 312/223.1 |
| 2016/0070939 A1 | 3/2016 | Bytheway | |
| 2016/0188912 A1* | 6/2016 | Neo | G06F 21/87 |
| | | | 361/749 |
| 2017/0108543 A1* | 4/2017 | Brodsky | H05K 3/10 |
| 2017/0110835 A1* | 4/2017 | Hasegawa | H01R 13/6683 |
| 2017/0265316 A1* | 9/2017 | Grunow | H01H 9/042 |

OTHER PUBLICATIONS

English translation of the French Written Opinion dated Jan. 24, 2017 for corresponding French Application No. 1653130, filed Apr. 8, 2016.

* cited by examiner

DETECTION OF THE OPENING OF A DATA-ENTRY DEVICE

1. CROSS REFERENCE TO RELATED APPLICATIONS

This Application claims priority to and the benefit of French Patent Application No. 1653130, filed Apr. 8, 2016, the content of which is incorporated herein by reference in its entirety.

2. FIELD OF THE DISCLOSURE

The disclosure relates to the field of data-entry devices such as payment terminals. The disclosure relates more particularly to the securing of such data-entry devices, for example by the detection of opening or intrusion.

3. PRIOR ART

Payment terminals process sensitive data. They need to be protected through hardware and/or protective software measures against attempts at fraud.

Hardware protective measures include especially techniques intended to detect the opening of the housing or cover of the electronic payment terminal, for example through the use of "false keys" made of elastomer and associated with "carbon pads" or "metal domes" enabling verification that the terminal has not been subjected to any attempt to disassemble it.

Indeed, a payment terminal classically comprises an upper half-shell and a lower half-shell, also called an upper cover and a lower cover. The upper cover comprises apertures through which, for example, the keys of the keypad and the display screen of the payment terminal can emerge.

Figure 1:
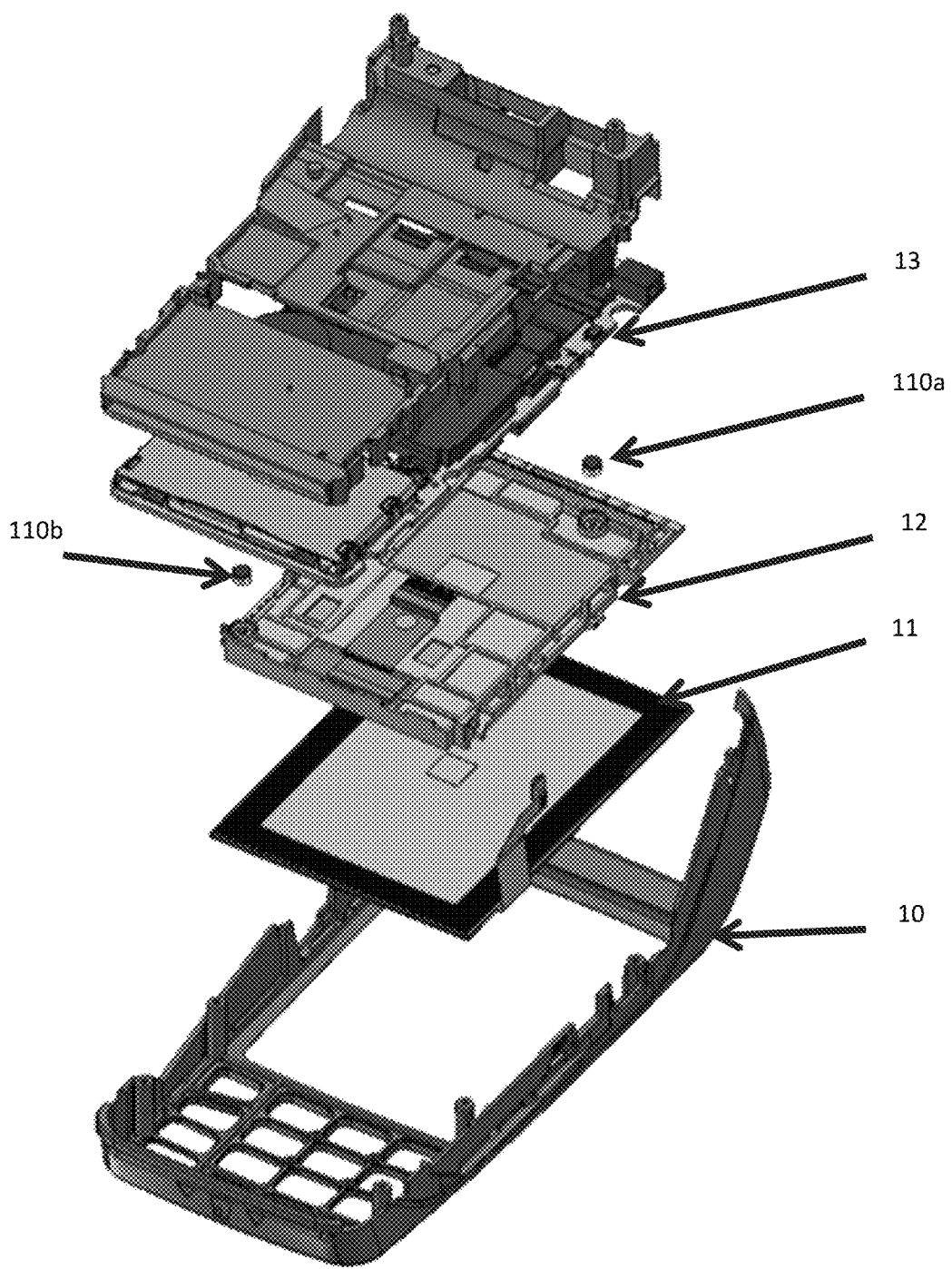

Classically, the different parts of a payment terminal are mounted through the interior of the upper cover in order to ensure the security of the terminal, as illustrated for example with FIG. 1 which represents a view of the interior of the upper cover. In addition, at the keypad for example, the "false keys" are used to verify firstly that the upper cover of the terminal is properly fitted into the lower cover and secondly that the false keys rest on at least one printed-circuit board (mother board 13) present in the payment terminal. This ensures that the payment terminal is not open and, therefore, that there has been no attempt to introduce a snooper device into the keyboard of the payment terminal for example. The false keys are pressed, for example, by means of an extension made of plastic (which may or may not be solid) extending from within the upper cover to take position on the false key of the printed-circuit board (mother board). On the screen, when the capacitive pad 11 (enabling both the display of data and the entry of data in tactile mode) is mounted within the upper cover, an appreciably equivalent technique is implemented, for example using elements 110a and 110b, provided on a printed-circuit board 12 called a display support, to exert a force between the mother board 13 and the upper cover 10. This prior-art solution is generally fairly efficient. However, this solution is fairly old and not necessarily suited to the novel types of payment terminals, which are preferably becoming increasingly small sized.

Indeed, it is difficult to create such false keys when the keys of the keypad are disposed compactly and close together because the prior art solution calls for relatively large spaces between the keys so that extensions made of plastic, extending from the interior of the upper cover, can pass through the keypad and take position on the false key of the mother board. Now, the goal of reducing the size of the payment terminals means that the space available for such plastic extensions is not obligatorily present.

Another drawback of the hardware techniques for securing payment terminals relates to the esthetic and manufacturing requirements for present-day payment terminals. Thus, it is often recommended that the capacitive pad should be mounted from the exterior of the upper cover so that the touch screen is truly flush with the surface of the payment terminal, as is the case for example for smartphones. Thus, at present, the capacitive pad is bonded or glued to the upper cover instead of being mounted by the interior of the payment terminal. Now, from a security viewpoint, the capacitive pad can no longer be used to detect an intrusion or an opening of the upper cover of the payment terminal through the use of elements that set up forces between the mother board of the payment terminal and the upper cover and that close a switch, thus making it possible to detect an opening of the cover through detection of the opening of the switch. Indeed, the effect of these forces on a capacitive pad bonded from the exterior of the upper cover would be to detach this pad.

There is therefore a need for a solution that can be used to detect an opening or an intrusion into a payment terminal, in order to prevent any access to zones that are sensitive from a security viewpoint, especially when the capacitive pad is bonded from the exterior of the upper cover of the payment terminal. Such a technique must therefore enable a detection of this kind without generating any forces between the mother board of the payment terminal and the capacitive pad, so as not to prompt a detachment of this pad.

4. SUMMARY OF THE DISCLOSURE

The disclosure relates to a data-entry device comprising an upper cover to which a capacitive pad is affixed, the capacitive pad having at least one flexible security element having at least one electrical track connected to a cut-detection module in the device, the shape and mounting of the security element in the device being adapted to exerting a force on the internal face of the upper cover.

Thus, the disclosure proposes a novel and inventive solution to the securing of the data-entry device, for example an electronic payment terminal, enabling the detection of an attempt to open the terminal through its upper cover to which a capacitive pad is bonded.

To this end, the solution of the disclosure provides for the implementing of at least one flexible security element having one (or more) electrical tracks fixed under the capacitive pad (itself fixed above the upper cover) enabling the exertion of a force beneath the upper cover, without however any exertion of force on the capacitive pad, which would prompt the detachment of this pad.

Indeed, the specific shape and the mounting of the security element in the device enable it to exert this force inside the upper cover. Thus, when an attempt is made to tear off the capacitive pad, the security element can be damaged and the electrical track that passes through it can be damaged or even cut, or else the contact between the cut-detection module and the electrical track of the security element is cut. In this way, any attempt to open the payment terminal or intrude into it by detaching the capacitive pad is detected through the detection of a cutting of the electrical track or tracks that pass through the security element.

In particular, the security element has at least two parts, of which the first part is affixed to the internal face of the capacitive pad and the second part extends in a first mounting position perpendicularly to the first part. In addition, the second part of the security element can also take the following positions:
- a second mounting position in which the second part is inserted into at least one corresponding opening made in the upper cover;
- a securing position in which the second part is folded along one part of the internal face of the upper cover to exert a force on the internal face of the upper cover.

Thus, according to this embodiment of the disclosure, the flexible security element is fixed beneath the capacitive pad and inserted into a dedicated opening in the upper cover and then folded inside the upper cover, so as to exert a force on the upper cover without however exerting a force that would prompt the detachment of the capacitive pad.

To this end, the security element therefore has at least two parts, one part being fixed beneath the capacitive pad and the other extending perpendicularly so that it can be inserted into a dedicated opening of the upper cover and then folded beneath the upper cover to exert a force thereon.

According to one particular aspect of the disclosure, the cut-detection module is situated on a printed-circuit board mounted within the upper cover of the device and, in the securing position, the cut-detection module is in contact with the second part of the security element and, more particularly, with the track or tracks that pass through the security element.

Thus, according to this embodiment of the disclosure, the detection of the cutting of the electrical track of the security element is made by means of a cut-detection module situated on a printed-circuit board mounted by the interior of the terminal, directly beneath the capacitive pad. In this way, when the capacitive pad is mounted, the capacitive element folded by the interior on the upper cover and the printed-circuit board bearing the cut-detection module also mounted, then the electrical track of the security element is in contact with the cutting detection module.

For example, the printed-circuit board corresponds to the display support situated just beneath the capacitive pad.

In this way, when the data-entry device is entirely mounted, the security element of the capacitive pad is in contact with the cutting detection module. Hence, when there is an attempt to tear away/detach the capacitive pad, for example in order to try to access the interior of the device, the security element (which gets damaged or detached from the upper cover) is no longer in contact with the cut-detection module which then detects an attempted intrusion into the device.

For example, the security element corresponds to a flexible printed-circuit board, denoted as FPC.

The disclosure also relates to a method for detecting an intrusion into a data-entry device as described here above, according to the different embodiments of the disclosure, through a step for the detection of an intrusion when the electrical track or tracks of the security element are cut.

According to the different embodiments of the disclosure, the method for detecting is implemented by a module to detect cutting in the device.

5. FIGURES

Figure 2:
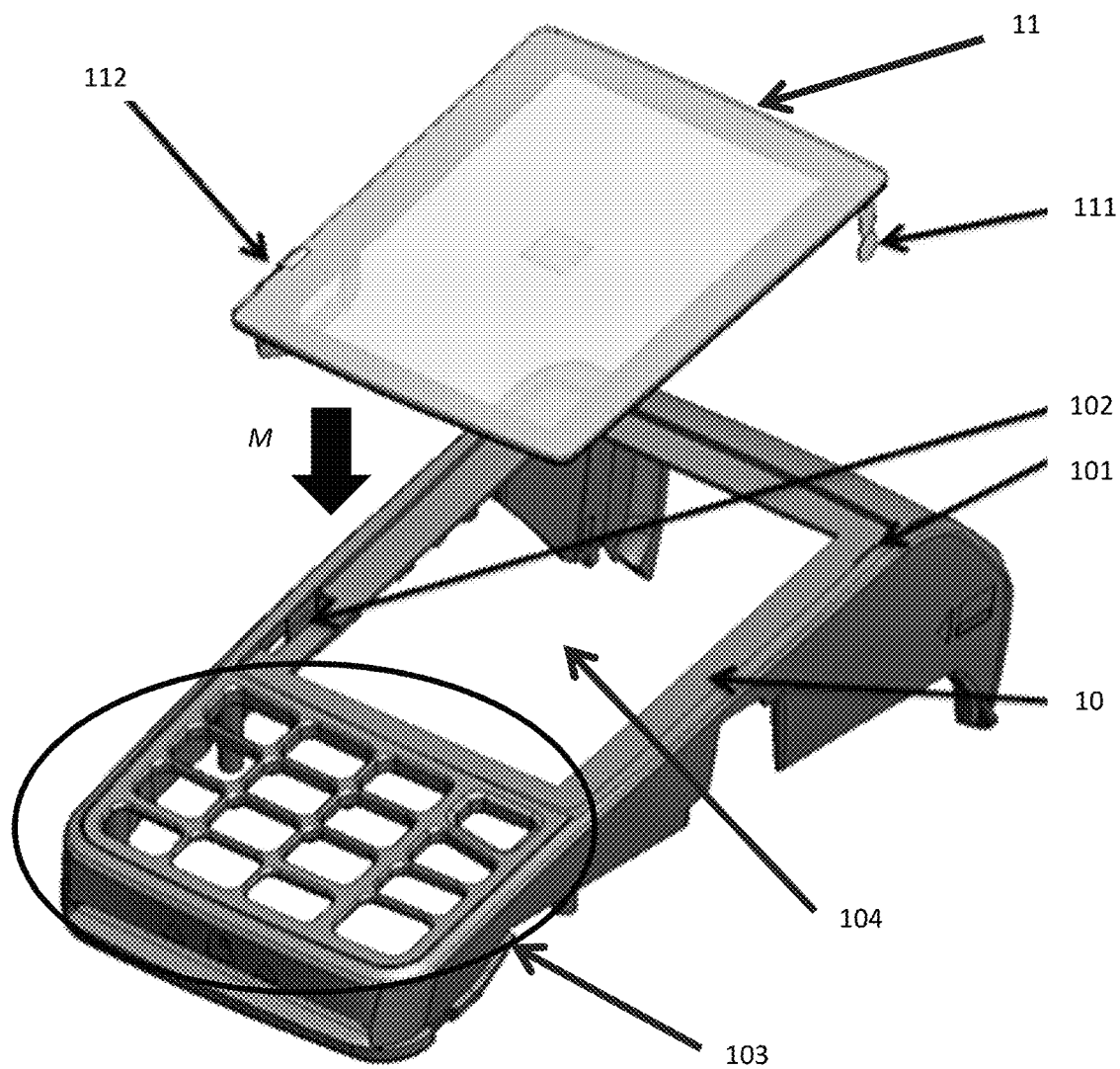
Figure 3A:
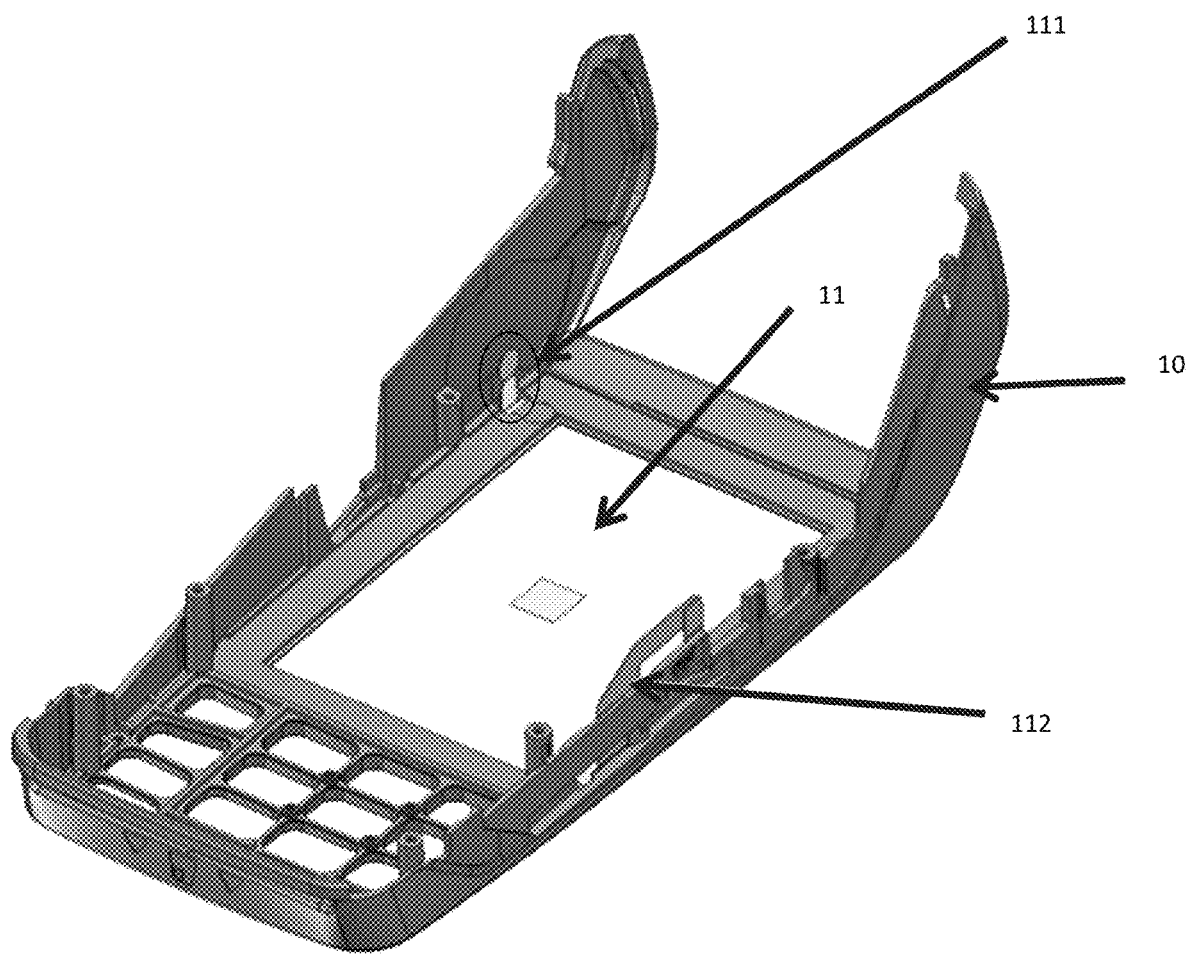
Figure 3B:
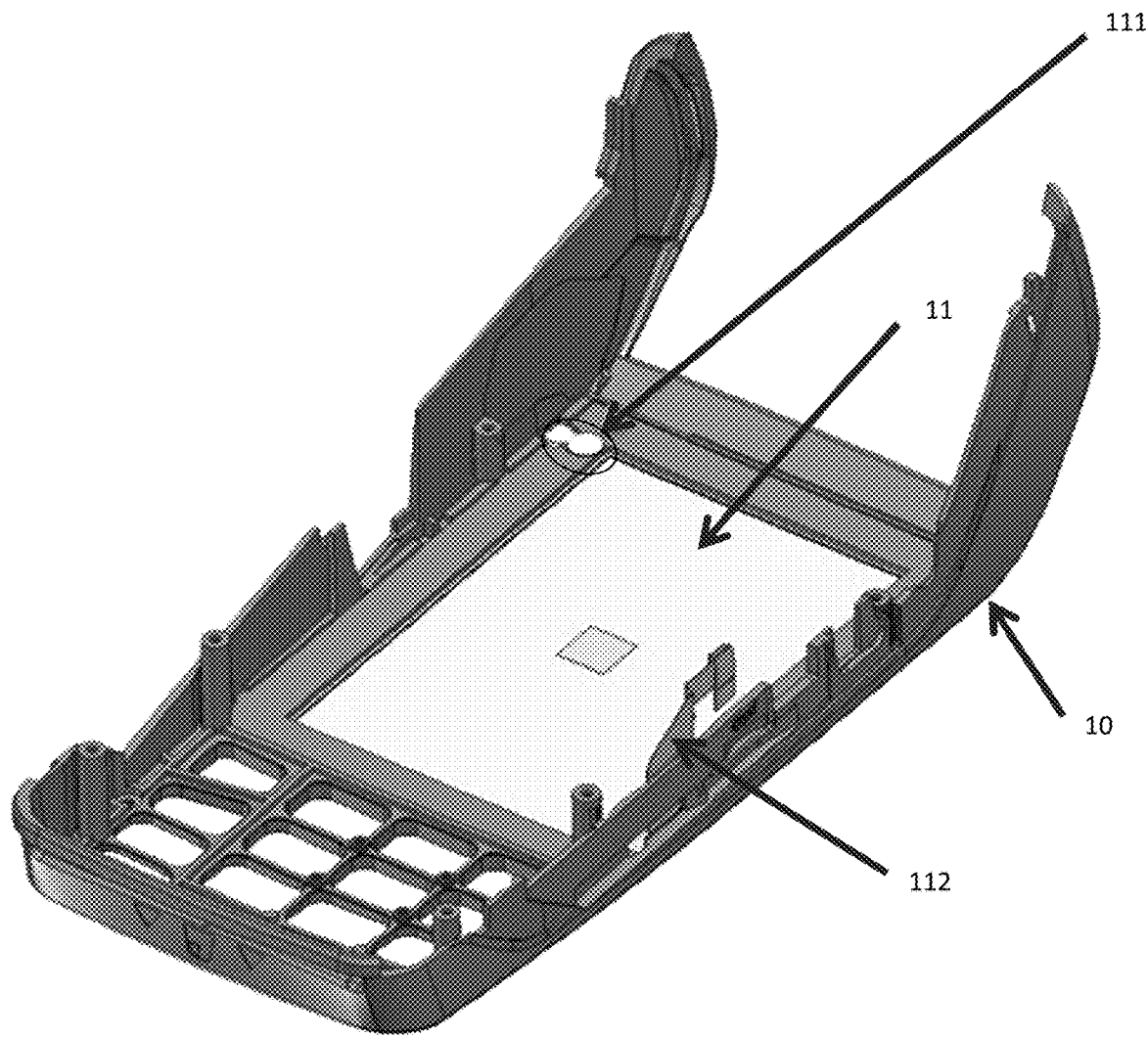
Figure 3C:
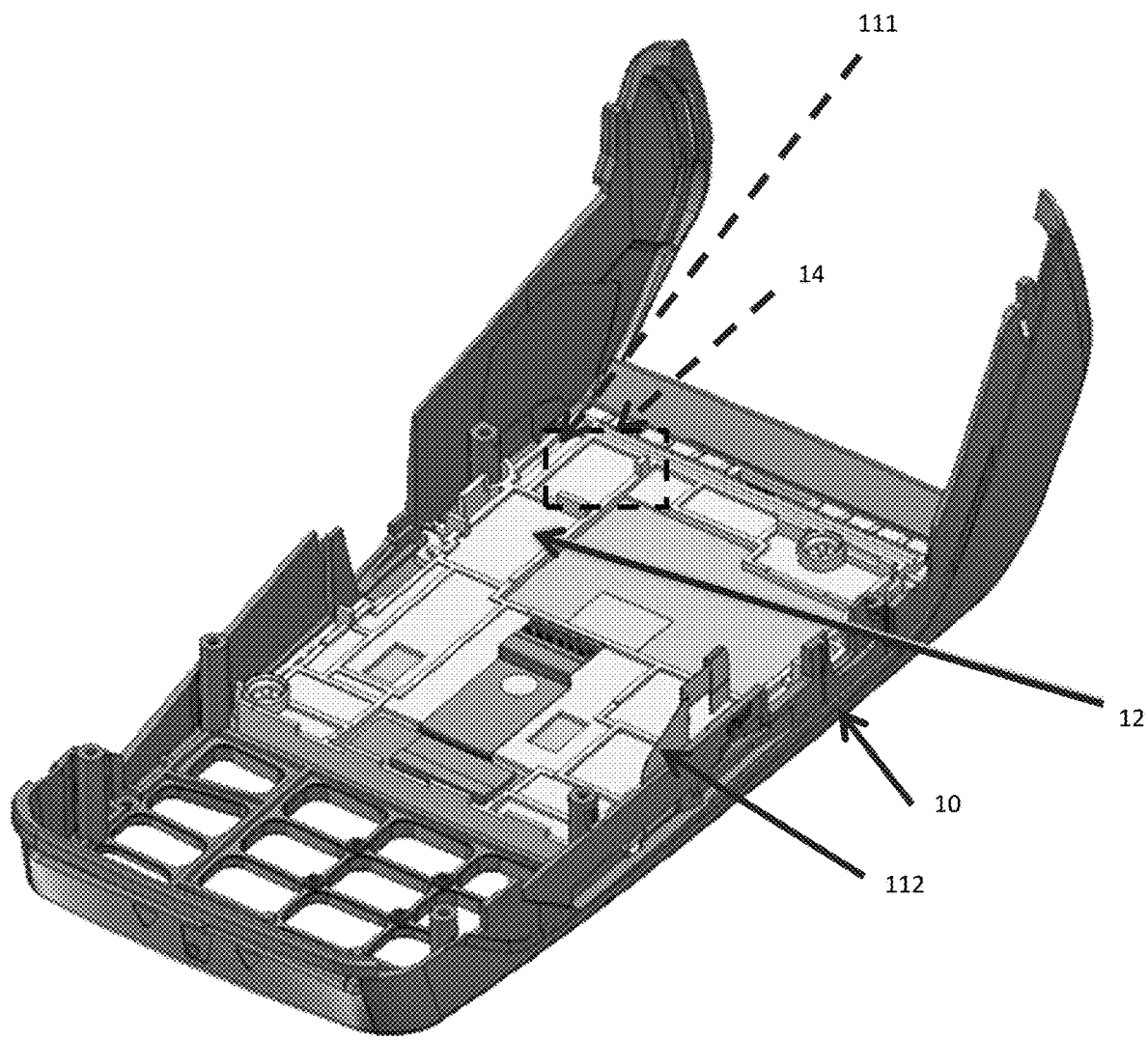

Other features and advantages shall appear more clearly from the following description of a particular embodiment of the disclosure, given by way of a simple, illustrative and non-exhaustive example and from the appended drawings, of which:

FIG. 1 is a schematic view of a part of a payment terminal according to the prior art, already discussed;
FIG. 2 illustrates an example of a security element according to one embodiment of the disclosure;
FIGS. 3a to 3c illustrate different positions of a security element according to one embodiment of the disclosure.

6. DESCRIPTION

The general principle of the described technique consists in securing a data-entry device having a capacitive pad mounted through the exterior of the upper cover of this device, in providing the capacitive pad with at least one flexible security element having an electrical track linked to a cut-detection module, enabling a force to be exerted beneath the cover and thus enabling the detection of any attempt to detach the capacitive pad.

Thus, the solution of the disclosure, in its different embodiments, can be used to secure a data-entry device with a capacitive pad mounted through the exterior of the upper cover, in using the principle of an element exerting a force on the cover through the interior so as not to prompt the detachment of the capacitive pad. In addition, this security element has at least one electrical track passing through it, the cutting of this track, when the element is damaged or detached from the interior of the upper cover, being detected by a cut-detection module.

Here below, a description is given more particularly of the embodiments in which the data-entry device corresponds to an electronic payment terminal, but the solution of the disclosure applies to any data-entry device responding to the same problems and issues related to securing. A description is also provided of the embodiments providing for a single security element through which only electrical track passes.

Referring now to FIGS. 2 and 3a to 3c, a description is provided of an example of an implementation of the solution of the disclosure in an electronic payment terminal with an upper cover 10.

FIG. 2 illustrates a top view of a part of such an electronic payment terminal, and especially of the upper cover 10 which has a plurality of small apertures 103 that are to receive the keys of a keypad as well as a large rectangular aperture 104 that is to receive a capacitive pad 11.

Such a capacitive pad 11 comprises especially, in a known way, a connection element 112, that is to get inserted in the aperture 102 provided for this purpose in the upper cover 10 to set up the connection between the capacitive pad and one or more printed-circuit boards of the electronic payment terminal.

In addition, according to this embodiment of the disclosure, the capacitive pad 11 has a security element 111, to enable the detection of any attempt at intrusion/opening of the electronic payment terminal by the detaching of this capacitive pad 11.

This security element 111 comprises at least two parts, of which one (not visible in FIG. 2) enables it to be affixed to the capacitive pad 11 and the other enables it to interact with the upper cover 10 to exert a force. In addition, the security element 111 is crossed by an electrical track (not illustrated) coming into contact with a module to detect cutting (not shown) in the electronic payment terminal, in such a way that when the electrical track is cut following an attempt to detach the capacitive pad 11 and therefore following damage/detachment of the security element, an attempted intrusion into the electronic payment terminal is detected.

According to this embodiment, and in the first position of mounting of the capacitive pad 11 on the upper cover 10 illustrated in FIG. 2, the security element 111 is therefore affixed to the internal surface of the capacitive pad 11, i.e. towards the upper cover 10, in the mounting (M) direction indicated by the large arrow M in FIG. 2. For example, the capacitive pad 11 is glued to the upper cover 10 by its edges in a location provided for this purpose on the upper cover 10.

In addition, the security element 111 also comprises a part extending perpendicularly to the internal surface of the capacitive pad 11, again in the direction M in which the capacitive pad 11 is mounted on the upper cover 10, so that it can get inserted into the aperture 101 provided for this purpose in the upper cover 10.

FIGS. 3a to 3c illustrate view of the interior (from beneath) the upper cover 10, respectively in a second mounting position (FIG. 3a), a securing position (FIG. 3b) and a position (FIG. 3c) in which the capacitive pad 11 is covered by a display support 12.

As illustrated in FIG. 3a, the capacitive pad 11 is positioned on (for example glued to) the upper cover 10, the connection element 112 is inserted into the corresponding aperture 102 of the upper cover 10 and the security element 111 is inserted into the corresponding aperture 101 of the upper cover 10.

To exert a force on the upper cover 10 in a securing position (as illustrated in FIG. 3b), the second part of the security element 111 (i.e. the part that extended perpendicularly beneath the capacitive pad 11 in the mounting positions) must then be folded down inside the upper cover. The security element 111 is for example bonded (by adhesive or any other bonding technique) to the internal surface of the upper cover 10, so as to exert the desired force.

For example, the security element 111 corresponds to a flexible printed circuit (an FPC) board so that it can fulfill its two desired functions to secure the electronic payment terminal:

a force applied to the upper cover 10, by the interior, achieved through its flexibility, and the possibility of folding it down, once it is inserted into the corresponding aperture of the upper cover, an electrical contact with a cut-detection module of the electronic payment terminal, achieved through its electrical track, for detecting a cut when an attempt is made to detach the capacitive pad 11.

To be able to detect a cut, the security element 111 therefore needs to come into contact with a cut-detection module of the electronic payment terminal, as illustrated for example in FIG. 3c.

Thus, for example, a display support 12 is positioned, again by the interior of the upper cover 10, so as to cover the part of the security element 111 folded on the internal surface of the upper cover 10 and thus set up contact between the security element 111 and a cut-detection module 14.

As indicated on FIG. 3c, in doted lines, the security element 111 is under the display support 12, as well as the cut-detection module 14, so as to set up contact between them.

Thus, when the payment terminal is entirely mounted and in working condition, the security element of the capacitive pad is in contact with a cut-detection module. When an attempt is made to detach the capacitive pad, either the security element is damaged, and hence the electrical track that passes through it is damaged too, or the security element is torn off the interior of the upper cover and the contact with the detection module is therefore broken. In all these cases, the detection module detects a cutting of a contact and therefore an attempted intrusion into the electronic payment terminal.

Such a cut-detection module is well known and one of ordinary skill in the art would easily understand from the term "cut-detection module" that the module includes electrical circuit elements electrically connected in a closed electrical circuit with the electrical track and is configured to detect a break in the closed electrical circuit. A break in the track results in an open-circuit condition in which the monitored current (or an associated voltage) through the circuit drops to zero. The module could also detect a change in current/voltage. Other examples also exist and are not described here.

Thus the disclosure, in one embodiment, also relates to a method for detecting an intrusion into a secured data-entry device, by means of at least one security element as described here above. To this end, the method of detection implements a step for detecting an intrusion when the electrical track of the security element 111 is cut. This detection is especially implemented by the cut-detector circuit or circuits, known per se and not described herein.

The invention claimed is:

1. A data-entry device comprising:
   an upper cover having an exterior surface and an interior surface;
   a capacitive pad, enabling both a display of data and an entry of data in tactile mode, affixed to the exterior surface above the upper cover;
   a cut-detection module in said data entry device; and
   at least one flexible security element affixed to the capacitive pad, inserted into at least one corresponding opening of said upper cover and having at least one electrical track connected to the cut-detection module in said device, wherein a shape and mounting of said at least one flexible security element are adapted to exert a force on the interior surface of said upper cover.

2. The data-entry device according to claim 1, wherein said flexible security element has at least two parts, of which a first part is affixed to an internal face of said capacitive pad and a second part, and wherein said second part of said flexible security element is movable between the following positions:
   a mounting position in which said second part extends perpendicularly to the first part and to the internal face of the capacitive pad and is insertable into said at least one corresponding opening made in said upper cover; and
   a securing position in which said second part is folded along one part of the interior surface of said upper cover to exert said force on said interior surface of said upper cover.

3. The data-entry device according to claim 2, wherein said cut-detection module is situated on a printed-circuit board mounted inside said upper cover of said device and, in said securing position, the cut-detection module is in contact with said second part of said flexible security element and with said at least one electrical track.

4. The data-entry device according to claim 1, wherein said at least one flexible security element is formed of a flexible printed-circuit board, denoted as FPC.

5. A method comprising:
   detecting an intrusion into a data-entry device comprising:
   an upper cover having an exterior surface and an interior surface;

a capacitive pad, enabling both a display of data and an entry of data in tactile mode, affixed to the exterior surface above the upper cover;

a cut-detection module in said data entry device; and at least one flexible security element affixed to the capacitive pad, inserted into at least one corresponding opening of said upper cover, and having at least one electrical track connected to the cut-detection module in said device, wherein a shape and mounting of said at least one flexible security element are adapted to exert a force on the interior surface of said upper cover, wherein detecting comprises:

detecting the intrusion by the cut-detection module when said at least one electrical track of said at least one flexible security element is cut.

* * * * *